R. HUFF.
TRANSMISSION GEARING FOR MOTOR VEHICLES.
APPLICATION FILED MAY 6, 1909.
1,033,102.
Patented July 23, 1912.
2 SHEETS—SHEET 1.
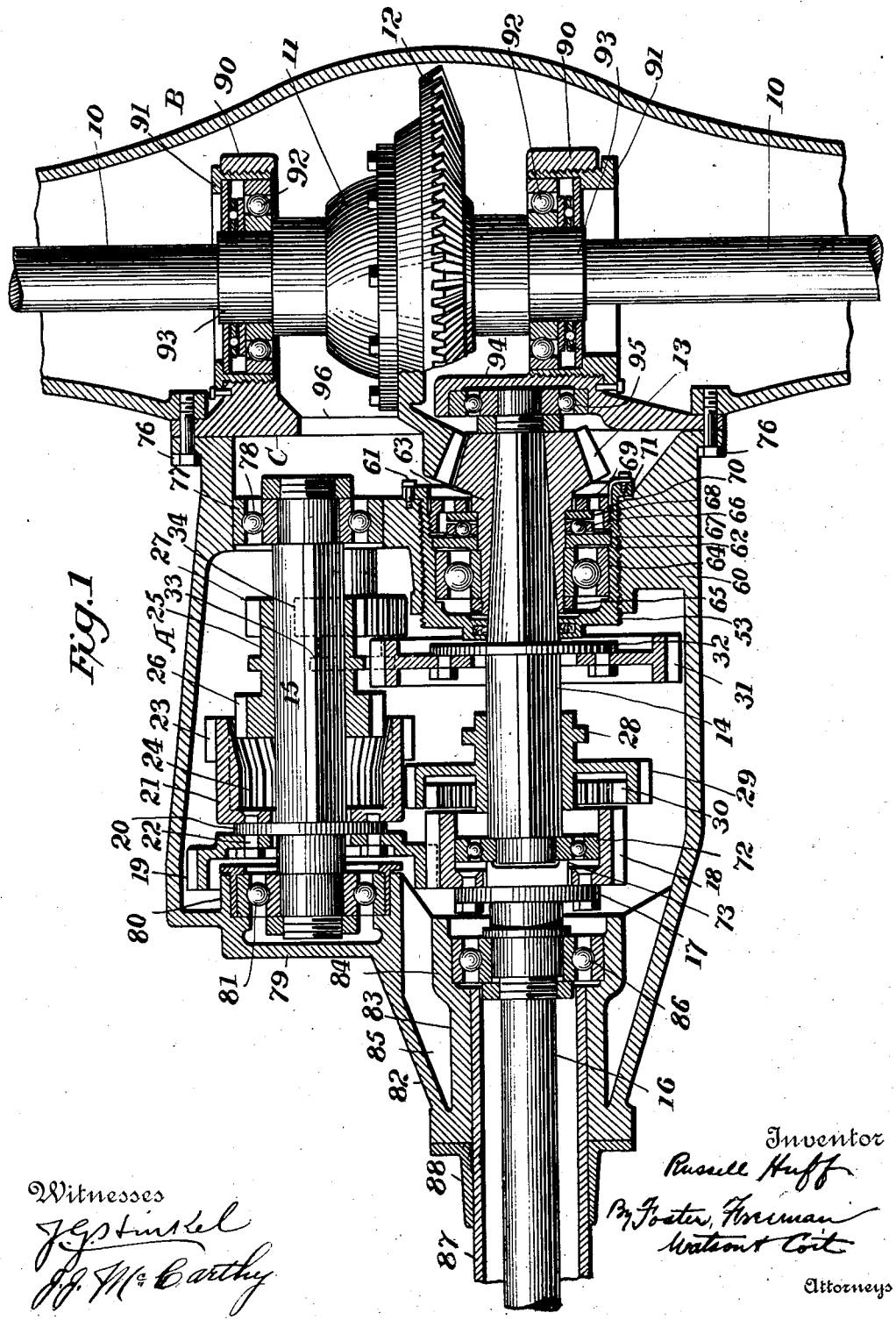

R. HUFF.
TRANSMISSION GEARING FOR MOTOR VEHICLES.
APPLICATION FILED MAY 6, 1909.
1,033,102.
Patented July 23, 1912.
2 SHEETS—SHEET 2.
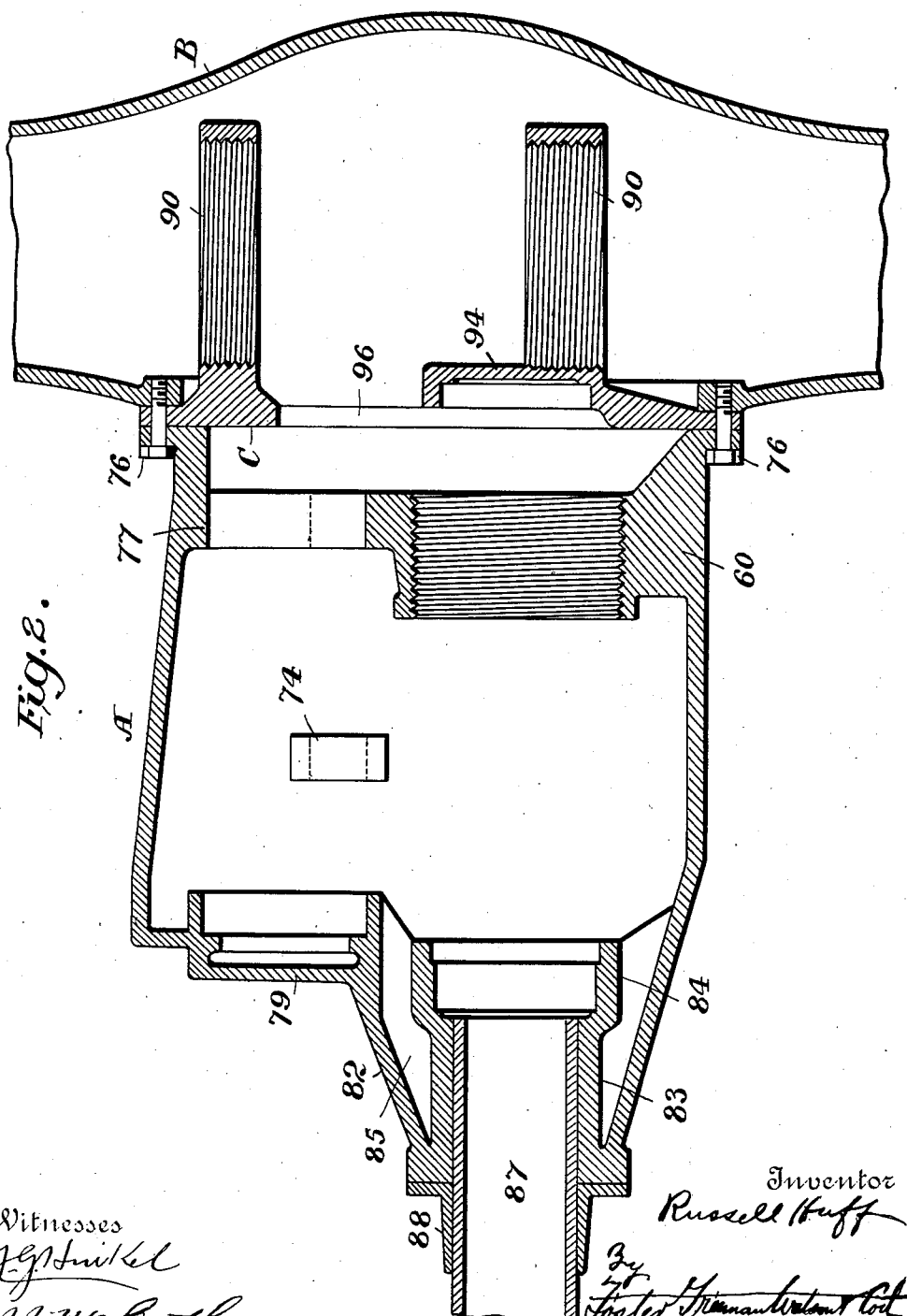

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TRANSMISSION-GEARING FOR MOTOR-VEHICLES.

1,033,102.      Specification of Letters Patent.      Patented July 23, 1912.

Application filed May 6, 1909. Serial No. 494,456.

*To all whom it may concern:*

Be it known that I, RUSSELL HUFF, a citizen of the United States, and resident of Detroit, in the county of Wayne and State of Michigan, have invented certain new and useful Improvements in Transmission-Gearing for Motor-Vehicles, of which the following is a specification.

This invention relates to transmission gearing, and particularly to transmission gearing for motor vehicles for transmitting the power from the motor shaft to the rear axle.

The objects of the invention are as follows: to construct the change speed mechanism and in particular a three-speed selective speed transmission mechanism so that it will be compact and in particular compact axially of the shafts; to provide a novel form of thrust bearing for the power shaft which receives the thrust in both directions; and to provide a novel form of three-piece casing or housing for the change speed and differential gears.

The nature, characteristic features and scope of my invention will be more fully understood from the following description taken in connection with the accompanying drawings forming part thereof, in which,—

Figure 1 is a longitudinal sectional view through the change speed and differential gearing; Fig. 2 is a cross section of the casing shown in Fig. 1.

In Fig. 1, A designates the change speed casing and B the differential gear casing. The rear axles 10 extend into the differential housing 11. This differential housing is provided with a bevel gear 12 which meshes with a pinion 13 on the shaft 14. The counter-shaft 15 is mounted in bearings in the casing A. The main driving shaft 16 which connects with the motor is located in axial alinement with the shaft 14.

Referring to Fig. 1 the shaft 16 is provided with a flange 17 to which is bolted gear 18 which meshes with the gear 19 on counter-shaft 15. An overhung gear 21 is mounted on the shaft 15 and is connected to a flange 20 on said shaft by means of bolts 22 extending through the webs in the gears 19 and 21 and the flange 20. The overhung gear is provided on its internal surface with strengthening ribs 24 and on its extreme surface with spur teeth 23. A sleeve 25 is slidingly mounted on the counter shaft 15 and is provided with gears 26 and 27. A sleeve 28 is slidingly mounted on the shaft 14 so as to turn therewith. This sleeve is provided with a gear 29 which has external teeth to coöperate with the teeth 23 and internal teeth 30 to coöperate with the teeth on the gear 18. A gear 31 is bolted to the flange 32 on shaft 14. A sliding sleeve 33 provided with a gear 34 is mounted upon a second counter shaft and this sleeve with its gear is connected with sleeve 25 so as to slide therewith. The gear 34 meshes with 27.

The first or low speed is obtained by sliding gear 26 into engagement with 31; the second speed by sliding gear 29 into engagement with the gear teeth 23; and the third or direct drive is obtained by sliding gear 29 into engagement with gear 18, and reverse by sliding 27 and 34 to left so that 34 engages with 31.

Shafts 14 and 15 are either square in cross section or provided with a key so that the sliding sleeves 25 and 28 are splined thereon. When sleeve 25 is moved to the left, the gear 26 telescopes with the overhung gear 21, the ribs 24 taking in between the teeth on the gear. It is to be noted however that since the sleeve 25 is splined on the shaft 15 these strengthening ribs do not act as gear teeth, but merely as strengthening ribs. They take in loosely between the teeth and do not contact therewith, so they may be left in a rough condition. Where the additional strength is not required the interior of the overhung gear may be left perfectly smooth by dispensing with the ribs 24. The function of said ribs 24 is therefore different from the function of the teeth 30 on the gear 29 which are used for driving purposes only.

It will be noted that the teeth on gear 27 do not mesh with teeth on gear 31. Therefore when the sleeve 25 is moved to the left the gear 27 will drive gear 31 through gear 34 in the reverse direction.

By means of the construction as shown in Fig. 1, the length of the change speed casing is decreased so that the distance between the outside gears on the shaft 16 and its alined shaft 14 is approximately equal to the width of five normal gear faces plus the clearance between the different gears.

Referring to Fig. 1, 53 is an externally threaded sleeve screwed into the lug 60 in the casing, the sleeve being held in locked position by a locking device 61. This sleeve is provided on its internal surface with a shoulder 62. The pinion 13 is provided with a shank 63 which surrounds the shaft 14 and extends into the sleeve 53. The shank is provided with a number of shoulders as shown. The sleeve receives the annular roller bearing 64, the outer ring of which tightly fits the sleeve and the inner ring is secured to the shank 63 by means of the threaded nut 65. The roller thrust bearing 66 is received between the annular rings 67 and 68 and surrounds the shank 63. The ring 67 bears against shoulder 62 and is restrained thereby. The ring 68 is secured in place by means of an inwardly projecting flange 69 on the threaded sleeve 70. This sleeve 70 is held in adjusted position by means of the locking device 71. The construction of the sleeve 53 and its bearings are such that the thrust of the pinion 13 and the shaft 14 is received in both directions through the roller bearings 66. By loosening the locking device 61 the sleeve and its attached parts may be removed as a unit.

The gear 18 has on its interior surface the roller bearing 72 for one end of the shaft 14 and this roller bearing bears against a lug 73 on the flange 17. The shaft 15 is supported in roller bearings 78 in the supporting lug 77 in the casing and at the other end by a roller bearing 81 supported by an inwardly projecting lug 80. 74 is the counter-shaft bearing lug.

The end 79 of casing A has an outwardly projecting lug 82 provided with an inwardly projecting sleeve 83, webs 85 connecting this sleeve with the casing proper. The sleeve 83 is provided with an enlarged portion 84 to receive the roller bearing 86. The casing 87 for the shaft 16 provided with flange collars 88 extends into the sleeve 83.

Referring to Fig. 1, the end of casing A is closed by an end piece C which is attached to the casing A and to the casing B by through-bolts 76. The end piece C is provided with a pair of bearing lugs 90 which receive the lower bearing sleeves 91 for the hubs 93 of the differential housing 11, and with an end bearing lug 94 for supporting the roller bearing 95 for the shaft 14. As shown in Fig. 1 the end piece C is provided with an opening 96 through which projects the bevel gear 12.

The term "roller bearing" as used in the specification and claims is used in its broadest sense, that is as a generic term including both ball and cylinder antifriction bearings.

It is obvious that various changes in the details of construction may be made without departing from the spirit of this invention, and it is therefore to be understood that this invention is not to be limited to the specific construction shown and described.

Having thus described the invention, what is claimed is:

1. In transmission gearing, in combination, a shaft, an overhung gear thereon and adapted to turn therewith, a smaller gear slidingly mounted on said shaft and adapted to turn therewith, said gears being constructed to telescope one within the other.

2. In transmission gearing, in combination, a shaft, an overhung gear thereon and adapted to turn therewith, a smaller gear splined to said shaft and constructed to telescope within the overhung gear, and strengthening ribs inside said overhung gear arranged to take between the teeth of said smaller gear.

3. In transmission gearing, in combination, a shaft, an overhung gear thereon and adapted to turn therewith, a smaller gear mounted on said shaft and adapted to turn therewith, one of said gears being splined on said shaft, whereby the gears are adapted to telescope one within the other.

4. In transmission gearing, in combination, a shaft, an internally shouldered overhung gear thereon and adapted to turn therewith, a smaller gear mounted on said shaft and adapted to turn therewith, one of said gears being splined on said shaft, whereby the gears are adapted to telescope one within the other, and the smaller gear arranged to take between the shoulders of said overhung gear.

5. In transmission gearing, in combination, a driving shaft, a driven shaft in alinement therewith, a fixed gear on each of said shafts and a plurality of sliding gears coöperating with said gears, said gears being constructed and arranged to drive said driven shaft at three speeds, the distance between the remote edges of the extreme gears on the alined shafts being approximately equal to the aggregate width of five normal gear faces.

6. In transmission gearing, in combination, a driving shaft, a driven shaft in alinement therewith, and a counter shaft, fixed gears on said shafts, sliding gears on said driven and counter shafts, said gears being constructed and arranged to drive said driven shaft at three speeds, the distance between the remote edges of the extreme gears on the alined shafts being approximately equal to the aggregate width of five normal gear faces.

7. In transmission gearing, in combination, a driving shaft, a driven shaft in alinement therewith, and a counter shaft, a fixed gear on each of said shafts, an overhung gear and a smaller gear mounted on said counter shaft to rotate therewith, said last mentioned gears being mounted for movement relative to each other on said shaft to telescope the small gear within the overhung gear.

8. In transmission gearing, in combination, a driving shaft, a driven shaft in alinement therewith, and a counter shaft, a fixed gear on each of said shafts, an overhung gear and a smaller gear mounted on said counter shaft to rotate therewith, said last mentioned gears being mounted for movement relative to each other on said shaft to telescope the small gear within the overhung gear, all of said gears being so constructed and arranged that the distance between the remote edges of the extreme gears on the alined shafts is approximately equal to the aggregate width of five normal gear faces.

9. In transmission gearing, in combination, a driving shaft, a driven shaft in alinement therewith, and a counter shaft, a fixed gear on each of said shafts, an overhung gear fixed on said counter shaft, a gear splined on said counter shaft and constructed and arranged to telescope within the overhung gear.

10. In transmission gearing, in combination, a driving shaft, a driven shaft in alinement therewith, and a counter shaft, a fixed gear on each of said shafts, an overhung gear interiorly provided with spaced shoulders and fixed on said counter shaft, a gear splined on said counter shaft and constructed and arranged to telescope within the overhung gear, and take between the shoulders of the latter.

11. In transmission gearing, in combination, a driving shaft, a driven shaft in alinement therewith, and a counter shaft, fixed meshing gears on the driving and counter shafts, a fixed gear on the driven shaft, an overhung gear fixed on the counter shaft, a gear splined on the counter shaft, adapted to mesh with the fixed gear on the driven shaft and constructed and arranged to telescope with the overhung gear, and a gear on the driven shaft adapted to mesh with either the overhung gear or the gear on the driving shaft.

12. In transmission gearing, in combination, a driving shaft, a driven shaft, a gear fixed on the driving shaft, an overhung gear on the driven shaft, and longitudinal sliding means coöperating with the gears constructed and arranged to drive said driving shaft at three speeds, the distance between the remote edges of the gear webs on the driving and driven shafts being approximately equal to the aggregate width of four normal gear faces.

13. In transmission gearing, in combination, a shaft, a bearing support, a thrust bearing comprising a shouldered sleeve surrounding the shaft, and a single thrust roller bearing located between the shoulders of the sleeve and constructed and arranged to receive the thrust of said shaft in both directions.

14. In transmission gearing, in combination, a shaft, a bearing support, a thrust bearing comprising a sleeve provided with an internal shoulder, a single thrust roller bearing adapted to rest within the sleeve against the shoulder, and a threaded sleeve adapted to be screwed into the first sleeve, said second sleeve being provided with an annular flange adapted to abut against the roller bearing, and said shaft being provided with shoulders adapted to coöperate with said roller bearing, whereby said bearing is adapted to receive the thrust in both directions.

15. In transmission gearing, the combination with change speed and differential mechanism, interconnected and arranged in proximity to each other, and bearings for said mechanisms, of two detachably connected supporting members arranged end to end and carrying all of said bearings.

16. In transmission gearing, the combination with differential mechanism, a bevel gear mounted thereon, a driving pinion meshing with said gear, and bearings for said mechanism and pinion, of two detachably connected supporting members arranged end to end and carrying all of said bearings.

17. In transmission gearing, the combination with change speed and differential mechanism, of a casing inclosing the change speed mechanism comprising a detachable end piece and bearings for said mechanism supported by the end piece.

18. In transmission gearing the combination with change speed and differential mechanism, of a casing inclosing the change speed mechanism comprising a detachable end piece, bearings for the change speed mechanism supported by the casing, and bearing lugs on the end piece for the differential mechanism.

19. In transmission gearing, the combination with change speed and differential mechanism, of a casing inclosing the change speed mechanism comprising a detachable end piece, bearings for the change speed mechanism supported by the casing, bearing lugs on the end piece for the differential mechanism, and a detachable inclosing casnig for the differential mechanism.

20. In transmission gearing, the combination with change speed and differential mechanism, of a casing inclosing the change speed mechanism comprising a main casing with an integral end and a detachable end piece, and bearings for said mechanism supported by said casing and end piece.

21. In transmission gearing, the combination with change speed and differential mechanism, of a casing inclosing the change speed mechanism comprising a main casing with an integral end and a detachable end piece, bearings for said change speed mechanism supported by said casing and end piece, and bearing lugs on the end piece for the differential mechanism.

22. In transmission gearing, the combination with change speed and differential mechanism, of a casing inclosing the change speed mechanism comprising a main casing with an integral end and a detachable end piece, bearings for said change speed mechanism supported by said casing and end piece, bearing lugs on the end piece for the differential mechanism, and a detachable inclosing casing for the differential mechanism secured to the change speed mechanism casing.

23. In transmission gearing, the combination with change speed and differential mechanism, of a casing inclosing the change speed mechanism comprising a detachable end piece, and bearing lugs on the casing for supporting the change speed mechanism independently of the end piece.

24. In transmission gearing, the combination with change speed and differential mechanism, of a casing inclosing the change speed mechanism comprising a detachable end piece, bearing lugs on the casing for supporting the change speed mechanism independently of the end piece, and an additional bearing on the end piece for said change speed mechanism.

25. In transmission gearing, the combination with change speed and differential mechanism, of a casing inclosing the change speed mechanism comprising a detachable end piece, bearing lugs on the casing for supporting the change speed mechanism independently of the end piece, and bearing lugs on the end piece for the differential mechanism.

26. In transmission gearing, the combination with change speed and differential mechanism, of a casing inclosing the change speed mechanism comprising a detachable end piece, bearings for the change speed mechanism supported at one end by the casing and at the other by the end piece.

27. In transmission gearing, the combination with change speed and differential mechanism, of a casing inclosing the change speed mechanism comprising a detachable end piece, said end piece having an inwardly projecting portion, bearings for the change speed mechanism supported at one end by the casing and at the other by the inwardly projecting end piece.

28. In transmission gearing, a change speed gearing casing comprising a one piece body portion forming the sides, bottom and end, and a detachable end piece.

29. In transmission gearing, a change speed gearing casing comprising a one piece body portion forming the sides, bottom and end, and a detachable end piece, said body portion being provided with bearing lugs.

30. In transmission gearing, a change speed gearing casing comprising a one piece body portion forming the sides, bottom and end, said end being provided with an inwardly extending bearing sleeve.

31. In transmission gearing, a change speed gearing casing comprising a one piece body portion forming the sides, bottom and end, said end being provided with an inwardly extending bearing sleeve, and strengthening webs connecting the sleeve and the casing.

32. In transmission gearing, a change speed gearing casing comprising a one piece body portion forming the sides, bottom and end, said end being provided with an outwardly projecting bearing lug provided with an inwardly projecting bearing sleeve.

33. In transmission gearing, a change speed gearing casing comprising a one piece body portion forming the sides, bottom and end, and a detachable end piece provided with a pair of bearing lugs.

34. In transmission gearing, a change speed gearing casing comprising a one piece body portion forming the sides, bottom and end, and a detachable end piece provided with a pair of bearing lugs, and a bearing lug extending into the casing.

35. In transmission gearing, a change speed and differential gearing casing comprising a one piece change speed gearing casing, a detachable end for said casing, and a detachable differential gearing casing.

36. In transmission gearing, a change speed and differential gear casing comprising a one piece body portion forming the side, bottom and end of the change speed casing, a detachable end piece, and a detachable differential gear casing attached to said end piece and body portion.

37. In transmission gearing, a change speed and differential gear casing comprising a one piece body portion forming the side, bottom and end of the change speed casing, a detachable end piece, and a detachable differential gear casing attached to said end piece and body portion, said end piece being provided with bearing lugs projecting into the differential gear casing.

38. In transmission gearing, the combination with a shaft, gearing on one end thereof, a sliding member having a plurality of gear faces arranged on the opposite end portion of said shaft, and a bearing support, of a single thrust roller-bearing adapted to receive the thrust on the shaft in both directions.

39. In transmission gearing, the combination with change speed and differential mechanism, of a casing arranged in advance of the differential mechanism and inclosing said change speed mechanism, and bearings for said differential mechanism supported by said casing so as to form a unit therewith.

40. In transmission gearing, the combination with change speed and differential mechanism, of a casing inclosing said change speed mechanism, and bearing lugs projecting from one end of said casing and in alinement with the change speed mechanism and forming bearings for said differential mechanism.

41. In transmission gearing, the combination with change speed and differential mechanism including driving and driven bevel gears, of a casing inclosing said change speed mechanism, and bearings for said bevel gears supported by said casing and arranged in alinement therewith.

42. In transmission gearing, the combination with change speed and differential mechanism, of a casing for said differential mechanism, a casing inclosing said change speed mechanism and adapted to be secured to said differential casing, and bearings for said differential mechanism supported by the second named casing.

43. In transmission gearing, the combination with change speed and differential mechanism, of a casing for said differential mechanism, provided with a front opening, a casing inclosing said change speed mechanism and adapted to be secured to said differential casing at said opening, and bearings for said differential mechanism supported by the second named casing.

44. In transmission gearing, the combination with change speed and differential mechanism, of a casing for said differential mechanism, provided with a front opening, a casing inclosing said change speed mechanism, bearing lugs projecting from an end wall of said change speed casing and forming bearings for said differential mechanism, and means for securing said change speed casing to said differential casing with said differential in place in its casing.

45. In transmission gearing, the combination with change speed and differential mechanisms, of casings inclosing said mechanisms, bearings for said differential mechanism supported by said change speed casing, and driven shafts extending into said differential casing and having a detachable connection with said differential mechanism.

46. In transmission gearing, the combination with change speed and differential mechanism, of a sectional casing inclosing said change speed mechanism, bearings for said change speed mechanism supported by one of the casing sections and bearings for said differential mechanism supported by another of said casing sections, and driven shafts having a detachable connection with said differential mechanism.

47. In transmission gearing, the combination with change speed and differential mechanism, of detachably connected casings inclosing said mechanisms and permitting the differential mechanism to be withdrawn from the differential casing with the change speed casing, bearing lugs projecting from an end wall of said change speed casing, hubs for said differential mechanism supported in said lugs, and driven shafts having a detachable connection to said hubs.

48. In transmission gearing, the combination with driving and driven bevel gears, of a support having bearings for said gears and adapted to support them as a unit, a casing for said driven bevel gear, and means for detachably securing said support to said casing with the driven bevel gear in its casing.

49. In transmission gearing, the combination with driving and driven bevel gears, of a support having a bearing for said driving bevel gear and a pair of spaced bearing lugs thereon for the driven bevel gear, a casing for said driven bevel gear, and means for detachably securing said support to said casing with the driven bevel gear in its said casing.

50. In transmission gearing, the combination with driving and driven bevel gears, of a support having bearings for said gears and adapted to support them as a unit, a casing for said driving and driven bevel gears, means for detachably securing said support to said casing with the bevel gears in their casing, and means for adjusting said gears relatively to each other on said support.

51. In transmission gearing, the combination with change speed and differential mechanism; of a casing open at one end and inclosing the said change speed mechanism, and an end piece forming a closure for the open end of the casing, and bearings for the differential and change speed mechanism supported by said end piece.

52. In transmission gearing, the combination with change speed and differential mechanism; of a casing open at one end and inclosing said change speed mechanism, an end piece detachably secured to the casing and forming a closure for the open end thereof, and bearings for the differential and change speed mechanism carried by said end piece.

In testimony whereof I affix my signature in presence of two witnesses.

RUSSELL HUFF.

Witnesses:
  VINCENT LINK,
  DON T. HASTINGS.